May 1, 1973　　　L. W. NIEDRACH　　　3,730,868
CARBON DIOXIDE SENSOR
Filed Dec. 21, 1970
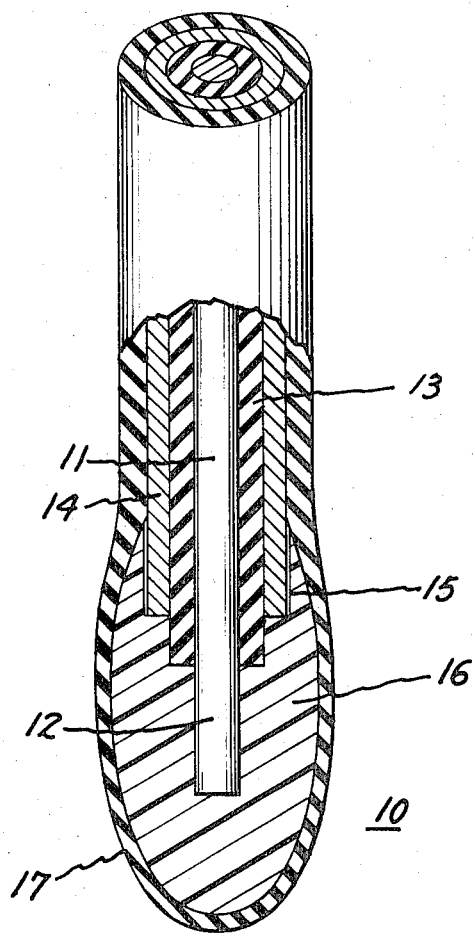
Inventor:
Leonard W. Niedrach,
by Paul R. Webb, II
His Attorney.

United States Patent Office 3,730,868
Patented May 1, 1973

3,730,868
CARBON DIOXIDE SENSOR
Leonard W. Niedrach, Schenectady, N.Y., assignor to General Electric Company
Filed Dec. 21, 1970, Ser. No. 100,126
Int. Cl. G01n 27/46
U.S. Cl. 204—195 P  3 Claims

ABSTRACT OF THE DISCLOSURE

A carbon dioxide sensor has an elongated flexible current collector with at least an exterior surface of gold or a noble metal on the current collector, an electrochemically active region of a quinone and a hydroquinone in electrical contact with a portion of the current collector, a second elongated flexible current collector surrounding at least partially the first current collector, a second electrochemically active region of silver and silver halide in electrical contact with the second current collector, a first layer of electrical insulation disposed between the first and second current collectors, a second layer of electrical insulation disposed over the second current collector, an anion exchange resin electrolyte contacting both electrochemically active regions, and an outer sheath of carbon dioxide permeable, ion-impermeable diffusion barrier material encapsulating at least the electrochemically active regions and the electrolyte.

Reference is made to copending patent application entitled "Sensor and Method of Making" filed Sept. 4, 1970, and given Ser. No. 69,650, which describes and claims a sensor including an ion exchange resin electrolyte and methods of manufacture. This copending application, in the name of Leonard W. Niedrach, is assigned to the same assignee as the present application.

Reference is made to copending patent application entitled "Carbon Dioxide Sensor" filed Oct. 16, 1970, and given Ser. No. 81,197, which describes a sensor including a sensing element of hydrided palladium with a surface coating of platinum black. This copending application, in the names of Leonard W. Niedrach and John A. Bergeron, is assigned to the same assignee as the present application.

This invention relates to carbon dioxide sensors and, more particularly, to carbon dioxide sensors employing as one of the sensing elements an electrochemically active region of a quinone and a hydroquinone in electrical contact with a portion of the current collector with at least an exterior surface of gold or a noble metal.

Carbon dioxide sensors are known in the prior art for determining carbon dioxide content of a sample. Such a sensor has a pH sensitive electrode, an electrolyte whose pH is sensitive to the partial pressure of carbon dioxide in equilibrium with it, a counter-reference electrode insensitive to changes in pH or bicarbonate concentration, and a diffusion barrier that is permeable to carbon dioxide but isolates the electrochemical sensing elements from the system to be monitored. In operation, the terminal voltage is a definite function of the partial pressure of the carbon dioxide in equilibrium with it.

My present invention is directed to an improved carbon dioxide sensor which is suitable for biomedical, environmental control and other applications.

The primary objects of my invention are to provide a rugged, dependable and miniaturized carbon dioxide sensor.

In accordance with one aspect of my invention, a carbon dioxide sensor comprises a first elongated flexible current collector with at least an exterior surface of gold or a noble metal on the current collector, an electrochemically active region of a quinone and a hydroquinone in electrical contact with a portion of the current collector, a second elongated flexible current collector surrounding at least partially the first current collector, a second electrochemically active region of silver and silver halide in electrical contact with the second current collector, a first layer of electrical insulation disposed between said first and second current collectors, a second layer of electrical insulation disposed over the second current collector, an anion exchange resin electrolyte contacting both electrochemically active regions, and an outer sheath of carbon dioxide permeable, ion-impermeable diffusion barrier material encapsulating the electrochemically active regions and the electrolyte.

These and various other objects, features and advantages of the invention will be better understood from the following description taken in connection with the accompanying drawing in which:

The single figure is a sectional view of a portion of a carbon dioxide sensor made in accordance with my invention.

In the single figure of the drawing, there is shown generally at 10 a portion of a carbon dioxide sensor embodying my invention. Sensor 10 is shown with a first elongated flexible current collector 11 in the form of a 20 mil gold wire with an electrochemically active region 12 of thymoquinone and thymohydroquinone in electrical contact with the lower end portion thereof. This electrochemically active region 12 provides the sensing electrode. A first layer of electrical insulation 13 in the form of Alkanex polyester resin lacquer surrounds current collector 11 but electrode 12 is exposed. A second elongated current collector 14 of silver paint surrounds at least partially the first current collector 11 whereby electrical insulation 13 is disposed between current collectors 11 and 14. Current collector 14 can be in a variety of configurations including a stripe, wire, etc. Such current collectors surround at least partially the first current collector. A second electrochemically active region 15 consists of silver and a silver halide on the lower portion of silver current collector 14. This electrochemically active region 15 provides the reference electrode. An anion exchange resin electrolyte 16 of quaternized polystyrene partially in its bicarbonate form and partially in its halide form contacts both electrochemically active regions 12 and 15, respectively, by bridging first polymer electrical insulation 13. A carbon dioxide diffusion barrier material 17 of silicone-polycarbonate is disposed over second current collector 14 as a layer of electrical insulation and encapsulates as an outer sheath the electrochemically active regions 12 and 15, and electrolyte 16. If desired, a separate layer of electrical insulation can surround current collector 14. The resulting device is a potentrometric carbon dioxide sensor.

I found that I could form the above improved carbon dioxide sensor by a method of applying successive elements from various organic solutions after which each solution solvent was evaporated. The application of the successive layers is preferably accomplished by immersion steps but other suitable means include coating, spraying, brushing, etc. The use of immersion steps is described and claimed in the above referenced copending application Ser. No. 69,650.

The carbon dioxide sensor of my invention can be formed by employing gold or a noble metal for the initial support wire forming the current collector. Other non-corrodible metals can be also used which employ at least an exterior surface of gold or a noble metal. If the sensor is to be employed in an oxidizing environment, gold is the preferred metal. The first electrochemically active region which can be employed for the sensing electrode is a quinone and a hydroquinone, such as thymoquinone and thymohydroquinone, duroquinone and durohydroquinone, etc. The second current collector can be silver or gold. If gold is employed, silver is deposited on at least a portion thereof. Second electrochemically active region which can be employed for the reference electrode are silver-silver halides except fluorides.

Various electrical insulating materials are useable and many of such materials can be applied by coating steps. Preferred materials include Viton hexafluoropropylene-vinylidene fluoride rubber, Alkanex polyester resin lacquer, silicone rubbers, and polypropylene oxides. I prefer to employ Alkanex polyester resin lacquer which provides the desired electrical insulation and which can be applied by coating or dipping. The Alkanex polyester resin lacquer can be crosslinked by heating to insolubilize and thereby facilitate the application of successive layers. I found that various carbon dioxide diffusion barrier materials are suitable as an outer sheath to encapsulate at least the electrochemically active regions and the electrolyte. The carbon dioxide permeable, ion-impermeable diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials which have been employed include silicone-polycarbonate copolymers. Viton hexafluoropropylene-vinylidene fluoride rubber and silicone rubbers.

An anion exchange resin can be employed as the electrolyte in our sensor and can be applied by coating. Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application. With this anion exchange resin types carbon dioxide sensor, suitable electrolytes include a terpolymer of methyl methacrylate, divinylbenzene and 2 - hydroxy - 3 - trimethylammonium propyl methacrylate partially in the bicarbonate form and partially in the chloride form and quaternized polystyrene partially in the bicarbonate form and partially in the chloride form.

A quaternized polystyrene is a polystyrene which is partially converted to a quaternary amine derivative. The manufacture of this electrolyte involves the chloromethylation and subsequent quaternization of polystyrene.

Equation (1)

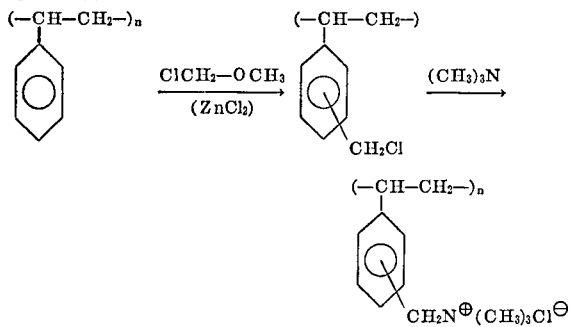

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain optimal values which correspond to chlorine contents of 4.0–6.5% for the chloromethylated but not quaternized resin, about 1 chloromethyl group for every 5 to 8 repeat units. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No cross-linking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20% water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation (2).

Equation (2)

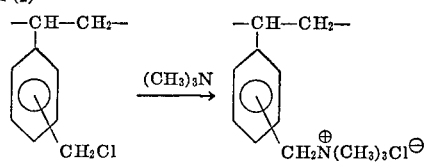

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20% solution in dioxane. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C. in vacuo.

My carbon dioxide sensor can be formed by applying successive elements from various organic solutions after which each solution solvent is evaporated. The application of the successive layers is preferably accomplished by a series of immersion or application coating steps.

With reference to the single figure of the drawing a carbon dioxide sensor is formed in accordance with our invention by employing a 20 mil gold wire 11 as the base or support upon which the successive elements are applied. This wire is the first elongated flexible current collector 11 of the sensor. The wire has its central portion immersed in a solution of Alkanex polyester resin lacquer to apply a first layer of electrical insulation 13 on current collector 11. It will be appreciated, of course, that a tube of insulation could be applied over the central portion of the current collector by slipping the tube over the collector. Opposite ends of wire 11 are exposed and not coated by insulation 13. A second elongated flexible current collector 14 of silver or gold is applied to surround the first current collector 11 by applying, such as by painting or plating the silver or the gold thereon. Second active region 15 at the one end of the collector is silver and a silver halide such as silver chloride which chloride is applied to silver current collector 14 by a chloriding step such as anodization in a chloride solution. If gold is employed as second current collector 14, silver is deposited electrochemically and then silver chloride is formed on its surface. Other silver halides are suitable except for fluorides. A first electrochemically active region 12 is formed in electrical contact with current collector 11 by applying a solution of the quinone, hydroquinone, and an ion exchange resin in a suitable organic solvent. The opposite exposed end (not shown) is provided for subsequently applying an electrical lead thereto.

A second layer of electrical insulation can be applied over second current collector 14 except for a small region at the upper end for subsequently applying an electrical lead thereto. However, we prefer to employ the subsequently applied carbon dioxide diffusion barrier in this manner thereby eliminating the need for a separate electrically insulating coating on collector 14. The lower end of the structure with electrochemically active regions 12 and 15 is immersed in a solution of quaternized polystyrene in the initial chloride form thereby forming ion exchange resin electrolyte 16. Electrolyte 16 is in contact with both regions 12 and 15. If desired, the first active region can be applied with the electrolyte by mixing the quinone and the hydroquinone in the solution of quaternized polystyrene.

Electrolyte 16 is converted to a partially bicarbonate form and a partially chloride form by immersion in an aqueous $KCl$-$KHCO_3$ solution. A diffusion barrier of silicone-polycarbonate is then applied as an outer sheath 17 encapsulating the electrically active regions 12 and 15, electrolyte 16, and second current collector 14.

The resulting carbon dioxide sensor can be used for clinical or other analysis. A high impedance volt-meter is connected to the respective electrodes. The terminal voltage from the sensor in operation will be a function of the carbon dioxide partial pressure in equilibrium with it.

Reference is made to copending patent application entitled "Sensor and Method of Manufacture" filed Oct. 15, 1970, and given Ser. No. 80,903, which describes and claims a sensor including a rigid, electrically insulating matrix and a pair of current collectors embedded in the matrix.

In another aspect of my invention employing such a matrix, a first elongated current collector is in the form of a gold wire and the second elongated current collector is in the form of a silver wire. These elongated current collectors, which are generally parallel and spaced apart, are embedded in a rigid, electrically insulating matrix of a material such as a cured epoxy resin. The matrix insulates electrically one current collector from the other current collector while both opposite ends of the current collectors are exposed.

The first electrochemically active region is a quinone and a hydroquinone in electrical contact with one exposed end of the first collector. A second electrochemically active region of silver and silver halide is in electrical contact with the adjacent exposed end of the second current collector. An ion exchange resin electrolyte of quaternized polystyrene partially in its bicarbonate form and partially in its chloride form contacts both of the electrochemically active regions. An outer sheath of carbon dioxide diffusion barrier material of silicone-polycarbonate encapsulates the active regions and the electrolyte. An electrical lead can also be in contact with each of the current collectors at the opposite end of the matrix.

Examples of carbon dioxide sensors made in accordance with our invention are as follows:

EXAMPLE 1

A carbon dioxide sensor was formed in accordance with the above description and as shown generally in the single figure of the drawing. The current collector was in the form of a 20 mil gold wire which was immersed in a solution of Alkanex polyester resin lacquer except for about 1 centimeter at each end. The coated wire was heated at a temperature of 100° C. to evaporate the solvent and then to 200° C. to crosslink the coating. This coating step was repeated several times. The second current collector was applied in the form of a silver wire in spiral fashion around the first insulation. The second electrochemically active region was in the form of a closer spiral of the same wire which had been chlorided by anodization in 0.1 N HCl acid solution using a platinum flag as a counter electrode. After the second electrochemically active region had been formed, the end of the first current collector had applied thereon the first electrochemically active region of thymoquinone and thymohydroquinone from a solution of these materials in an anion exchange resin of quaternized polystyrene. The end of the structure had applied thereon an anion exchange resin electrolyte. The structure had applied thereon quaternized polystyrene in the chloride form having an ion exchange capacity of 1.4 milliequivalents per gram. The electrolyte layer was applied by immersing one end of the structure in a solution of the resin in a mixture of chloroform-methanol to contact both electrochemically active regions. The structure was then heated in nitrogen at 50° C. for 10 minutes to eliminate any residual solvents.

The electrolyte was converted to a partially bicarbonate form and partially chloride form. The conversion of the electrolyte was accomplished by immersing the structure in an aqueous 0.1 M $KCl$-0.1 M $KHCO_3$ solution to convert the electrolyte to a mixed bicarbonate-chloride form of resin. The structure was then rinsed briefly in water and dried for about 1 minute in flowing nitrogen gas at 50° C.

A second layer of electrical insulation was then applied over the second current collector of the device by immersing the structure in a solution of a silicone-polycarbonate resin. This material is both a diffusion barrier material and has electrical insulation properties. The structure was covered with the same respective material whereby in addition to a layer being formed over the second current collector a carbon dioxide diffusion barrier also encapsulated both of the electrically active regions and the electrolyte. The resulting structure was a carbon dioxide sensor.

EXAMPLE 2

The above sensor formed in Example 1 was tested by measuring its terminal voltage with a high impedance millivoltmeter during equilibration with atmospheres of various percentages of nitrogen as set forth below in Table I. In an ideal aqueous electrolyte system containing bicarbonate ion the anticipated voltage change is 59 millivolts per decade change in carbon dioxide partial pressure. The voltage change of the present sensor corresponds to a slope of approximately 50 millivolts per decade change.

TABLE I

| Percent $CO_2$ in atmosphere: | Terminal voltage, millivolts (mv.) |
|---|---|
| 1.06 | 17 |
| 2.13 | 31 |
| 5.00 | 51 |
| 10.2 | 66 |

While other modifications of the invention and variations thereof which may be embraced within the scope of the invention have not been described, the invention is intended to include such as may be embraced within the following claims.

What I claim as new and desire to secure by Letters Patent of the United States is:

1. A carbon dioxide sensor comprising a first elongated current collector with at least an exterior surface selected from the class consisting of gold and the noble metals on the current collector, an electrochemically active region of a quinone and a hydroquinone on a portion of the current collector and in electrical contact therewith, a second elongated current collector, a second electrochemically active region of silver and silver halide in electrical contact with the second current collector, the first and second current collectors are insulated electrically from each other, an anion exchange resin electrolyte contacting both electrochemically active regions, and an outer sheath of carbon dioxide permeable, ion-impermeable diffusion barrier material encapsulating at least the electrochemically active regions and the electrolyte.

2. A carbon dioxide sensor as in claim 1, in which the second elongated current collector surrounds at least partially the first current collector, a first layer of electrical insulation is disposed between the current collectors, and a second layer of electrical insulation is disposed over the second current collector.

3. A carbon dioxide sensor as in claim 2, in which the first current collector is a wire with an exterior surface of gold, the first electrochemically active region is thymoquinone and thymohydroquinone, the second current collector is silver, the second electrochemically active region is silver and silver chloride, the electrolyte is quaternized polystyrene partially in its bicarbonate form and partially in its chloride form, the first insulation is a polyester resin lacquer, and the second insulation and diffusion barrier are silicone-polycarbonate.

References Cited

UNITED STATES PATENTS

| | | | |
|---|---|---|---|
| 3,098,813 | 7/1963 | Beebe et al. | 204—195 |
| 3,134,697 | 5/1964 | Niedrach | 136—86 F |
| 3,278,408 | 10/1966 | Leonard et al. | 204—195 |
| 3,382,105 | 5/1968 | McBryar et al. | 136—86 F |
| 3,415,730 | 12/1968 | Haddad | 204—195 |

TA-HSUNG TUNG, Primary Examiner